US008484582B2

(12) United States Patent
Broicher et al.

(10) Patent No.: US 8,484,582 B2
(45) Date of Patent: Jul. 9, 2013

(54) ENTRY SELECTION FROM LONG ENTRY LISTS

(75) Inventors: Frank H. Broicher, Aachen (DE); Brigitte Giese, Aachen (DE); Ludwig Gruber, Wuerselen (DE); Stefan Ortmanns, Monschau (DE); Friedhelm Wuppermann, Simpelveld (DE)

(73) Assignee: Nuance Communications, Inc., Burlington, MA (US)

( * ) Notice: Subject to any disclaimer, the term of this patent is extended or adjusted under 35 U.S.C. 154(b) by 375 days.

(21) Appl. No.: 12/464,756

(22) Filed: May 12, 2009

(65) Prior Publication Data

US 2010/0017393 A1  Jan. 21, 2010

Related U.S. Application Data

(60) Provisional application No. 61/052,589, filed on May 12, 2008.

(51) Int. Cl.
*G06F 3/14* (2006.01)

(52) U.S. Cl.
USPC ........................................................ 715/864

(58) Field of Classification Search
USPC ........................................................ 715/864
See application file for complete search history.

(56) References Cited

U.S. PATENT DOCUMENTS

| 6,317,489 | B1 * | 11/2001 | Parsadayan | 379/102.06 |
| 6,822,664 | B2 * | 11/2004 | Vale | 715/864 |
| 2002/0180806 | A1 * | 12/2002 | Zhang et al. | 345/816 |
| 2002/0193992 | A1 * | 12/2002 | Baker et al. | 704/249 |
| 2010/0299636 | A1 * | 11/2010 | Hawkins et al. | 715/816 |

* cited by examiner

*Primary Examiner* — Albert Phillips, III
(74) *Attorney, Agent, or Firm* — Sunstein Kann Murphy & Timbers LLP

(57) ABSTRACT

A method, device, and computer program product for locating a desired entry in a list containing multiple list entries for use with a limited text display is described. A list of entries is partitioned into a number of sub-parts such that the desired entry is contained in one of the list sub-parts. At least one of the sub-parts is characterized within a limited text display to prompt a user for feedback regarding the location of the desired entry in the sub-parts. The user feedback is received from a view input element. In response to the user feedback, the sub-part containing the desired entry is selected. The partitioning, characterizing, receiving, and selecting steps are re-performed one or more times until a final sub-part is generated that contains a limited number of entries including the desired entry.

21 Claims, 9 Drawing Sheets

ENTRY SELECTION FROM LONG ENTRY LISTS

The present application claims the benefit of U.S. Application Ser. No. 61/052,589, filed May 12, 2008, which application is incorporated herein by reference in its entirety.

FIELD OF THE INVENTION

The present invention relates to entry selection. More particularly, the present invention relates to entry selection from long entry lists.

BACKGROUND ART

Many applications select a single entry or subsets of entries from long entry lists. For example, mobile cellular devices may select a name or phone number from an address book, navigation devices may select a destination from a list of streets or cities, and MP3 players may pick a song out of a list of songs stored on the device. Current solution strategies for picking entries from a long entry list, such as "line selection" or "alphabetic selection by spelling," depend on relatively sophisticated user interfaces. For example, some strategies may use advanced speech synthesis engines using dynamic generation of grapheme to phoneme conversion to auditorily present the long entry list and to provide auditory feedback to the user. Such strategies may also use speech recognition engines to recognize a user's spoken entry selection. Additionally or alternatively, the strategies may use a sophisticated visual display for visual feedback. The visual display may display more than one line of text so that each entry is displayed on a separate line. This arrangement allows the user to select an entry using a voice command by referring to the line associated with the entry.

Nonetheless, as mentioned above, these interfaces are relatively sophisticated and may complicate and/or add cost to a device using them. Furthermore, many solution strategies for picking entries from a long entry list, such as "line selection" or "alphabetic selection by spelling," are typically not suitable for a device which has no dynamically generated auditory feedback, limited visual feedback (e.g. displays only one line of text with 12 characters), and no or minimal speech recognition capabilities (e.g., voice recognition of only a few selected words and/or affirmative and negative commands).

SUMMARY OF THE INVENTION

Embodiments of the present invention are directed to providing a solution for entry selection from long entry lists that works for a device with a limited text display. One embodiment of the present invention is directed to a method of locating a desired entry in a list containing multiple list entries. The method includes using a processor to partition the list of entries into a number of sub-parts such that the desired entry is contained in one of the list sub-parts. Then, at least one of the sub-parts is characterized within a limited text display to prompt a user for feedback regarding the location of the desired entry in the sub-parts. The user uses a view input element to provide feedback. The feedback is received at the processor from the view input element. In response to user feedback, the processor selects the list sub-part containing the desired entry. The partitioning, characterizing, receiving, and selecting are re-performed one or more times until a final sub-part is generated that contains a limited number of entries. The limited number of entries include the desired entry.

Embodiments of the present invention are also directed to a device for locating a desired entry in a list containing multiple list entries. The device includes a digital memory for storing the plurality of list entries and a processor for partitioning the list into multiple sub-parts such that the desired entry is contained in one of the list sub-parts. Also, the device includes a limited text display in which the list sub-parts can be characterized to prompt a user for feedback regarding the location of the desired entry in the list sub-parts. A view input element receives user feedback regarding the location of the desired entry in the list of sub-parts and in response to the user feedback, the processor selects the list sub-parts containing the desired entry and re-performs the partitioning, characterizing, and selecting one or more times to generate a final list sub-part of the list with a limited number of entries. The limited number of entries include the desired entry.

Other embodiments of the present invention are also directed to a computer program product for use on a computer system for locating a desired entry in a list having a plurality of list entries using a limited text display. The computer program product includes computer code for partitioning at least a portion of the list into a plurality of list sub-parts such that the desired entry is contained in one of the list sub-parts. Then, computer code characterizes at least one of the list sub-parts within the limited text display to prompt a user. The code prompts the user so that he provides feedback regarding the location of the desired entry in the list sub-parts. Next, computer code receives the user's feedback from a view input element. In response to the user feedback, the computer code selects the list sub-parts containing the desired entry. The code then re-performs the partitioning, characterizing, receiving, and selecting one or more times to generate a final list sub-part of the list with a limited number of entries. The limited number of entries include the desired entry.

In any of the above described embodiments, the limited number of entries may be a predetermined number of entries. The limited number of entries may also be the single desired entry. Furthermore, the partitioning, characterizing, receiving, and selecting may be re-performed a predetermined number of times.

In further specific embodiments of the above described embodiments, the list of entries may be partitioned into two sub-parts or more than two sub-parts. In certain embodiments, the list of entries may be sorted. For example, the list of entries can be sorted alphabetically. Also, the list may be initially selected from other lists by using a command word associated with the list.

In other specific embodiments of the above described device, method, and computer program product, entries in the final list sub-part are displayed within the limited text display. A user selection, made in response to the display of the final list sub-part, is accepted and the desired entry is selected in response to the user selection.

Furthermore, illustrative embodiments of the above described device, method, and computer program product may be performed by or incorporated into any one of a cellular phone, a smart phone, a personal assistant, a navigation device, or a media player.

DETAILED DESCRIPTION OF SPECIFIC EMBODIMENTS

Illustrative embodiments of the present invention are directed to entry selection from long entry lists. More specifically, illustrative embodiments of the present invention are used with devices having limited auditory and visual feedback and limited speech recognition functionalities in order to quickly select entries from long entry lists (e.g. fast entry selection).

Figure 1:
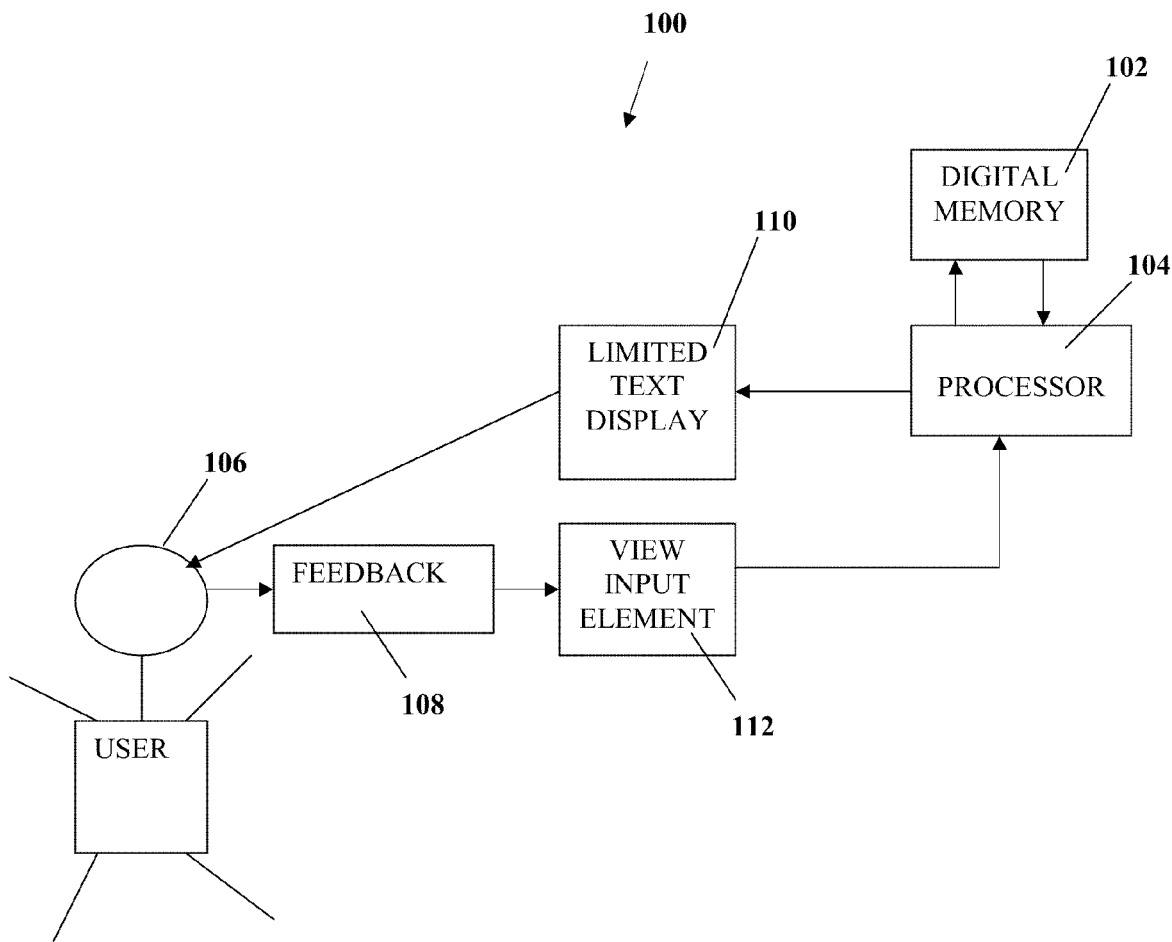
FIG. 1 is a schematic representation of a device for locating a desired entry in a long entry list in accordance with one embodiment of the present invention.

FIG. 1 is a schematic representation of a device 100 for locating a desired entry in a long entry list in accordance with one embodiment of the present invention. The device 100 includes a digital memory 102 in communication with a processor 104. The digital memory 102 typically stores entry lists, a title for each entry included in the lists, and a file or content associated with each entry. The processor 104 retrieves the entry lists with entry titles from the digital memory 102 and partitions the entry lists based on a user's 106 feedback 108 and the search strategies disclosed below. In some embodiments, the digital memory 102 stores the entry lists, the titles, and the content associated with each entry. Yet, in other embodiments, the digital memory 102 may simply store the lists and entry titles. Once an entry from the list is selected, the processor 102 may retrieve the file associated with the entry from another database or memory device.

Figure 2:
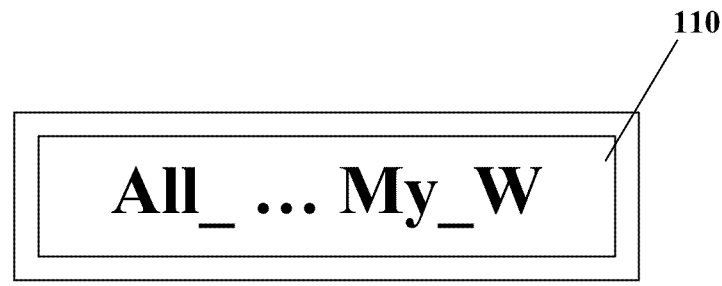
FIG. 2 shows an example of a one-line 12-character limited text display.

The processor 104 is also in communication with a limited text display 110. The limited text display 110 displays the entry titles and prompts the user 106 for feedback 108 regarding the location of a desired entry or entries within a sub-part of a list. FIG. 2 shows an example of a one-line 12-character limited text display 110. The limited text display 110 in FIG. 2 is a one-line 12-character text display. However, a limited text display 110 may be any type of display in which the resolution or size of the display allows for viewing only a few words or phrases in at most just a few lines of text.

As shown in FIG. 1, the user 106 interfaces with the device through a view input element 112. The view input element 112 allows the user 106 to respond to the prompts displayed in the limited text display 110. In some embodiments, the view input element 112 is configured to differentiate between affirmative user feedback 108 and a lack of affirmative user feedback 108. The view input element 112 may be a button or any other haptic input. The user's 106 suppression of the button may represent affirmative feedback 108. Whereas the user's 106 failure to suppress the button represents a lack of affirmative feedback 108. In this manner, the view input element 112 distinguishes between a user's 106 selection and a lack of the user's selection. For example, when an entry is displayed in the limited text display 110, the user 106 can suppress the button to select the entry. However, if the user 106 does not press the button, then the limited text display 110 may move on and display the next entry. In other embodiments, the view input element 112 may be a microphone in communication with a speech recognition engine. The speech recognition engine may recognize affirmative auditory feedback (e.g. "yes") and neutral auditory feedback (e.g., silence) 108. The speech engine may also recognize negative auditory feedback (e.g., "no") 108. Although a more sophisticated interface may be used, the present invention does not require a speech recognition engine that is more sophisticated than one which distinguishes between auditory feedback and a lack of auditory feedback 108.

The supporting interface may also vary based upon the system or product that incorporates the device 100. Illustrative embodiments of the present invention may be used with and/or incorporated into a variety of different electronic devices and systems. For example, the device 100 may be incorporated into a cellular phone, smart phone, personal assistant (e.g., PDA), navigation device (e.g., GPS) or media player. Illustrative embodiments of the present invention may take advantage of and use the memory devices, processors, displays, microphones, speakers, speech recognition engines, and/or speech generation engines already built into the electronic devices or systems.

Figure 3:
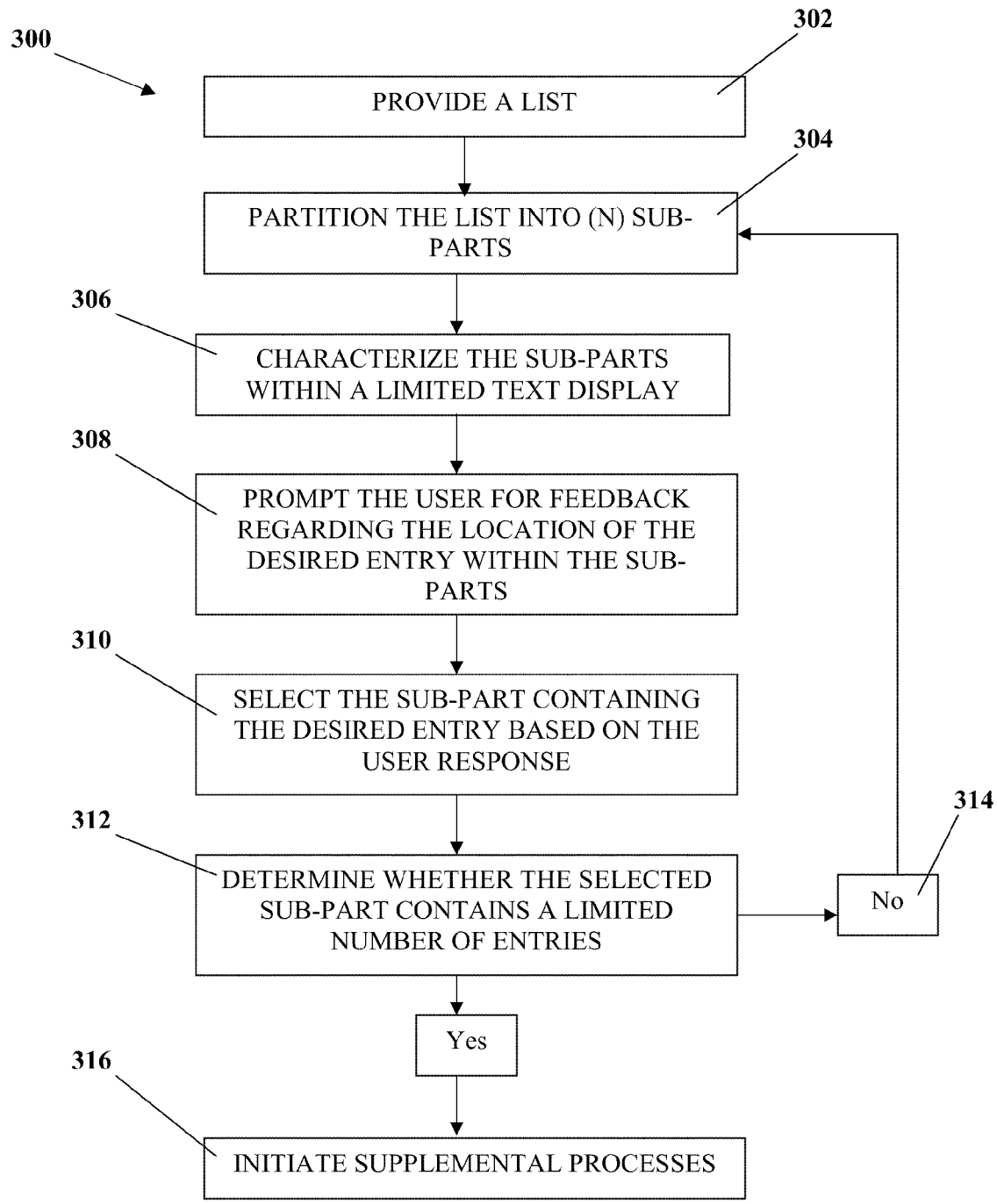
FIG. 3 shows a method for locating a desired entry in a long entry list in accordance with one embodiment of the present invention.

FIG. 3 shows a method 300 for locating a desired entry in a long entry list in accordance with one embodiment of the present invention. The method begins by providing a sorted list with multiple entries 302. Next, the sorted list is partitioned into (N) number of sub-parts 304. N can be any number greater than 1. Once the list is partitioned into multiple sub-parts, the sub-parts are characterized in such a way that they can be displayed on a limited text display 306. Then, the user 106 is prompted for feedback 108 regarding the location of the desired entry within the sub-parts by displaying the characterized sub-parts in the limited text display 308. FIG. 2 shows an example of a list sub-part that has been characterized to fit in a limited text display 110.

Figure 4:
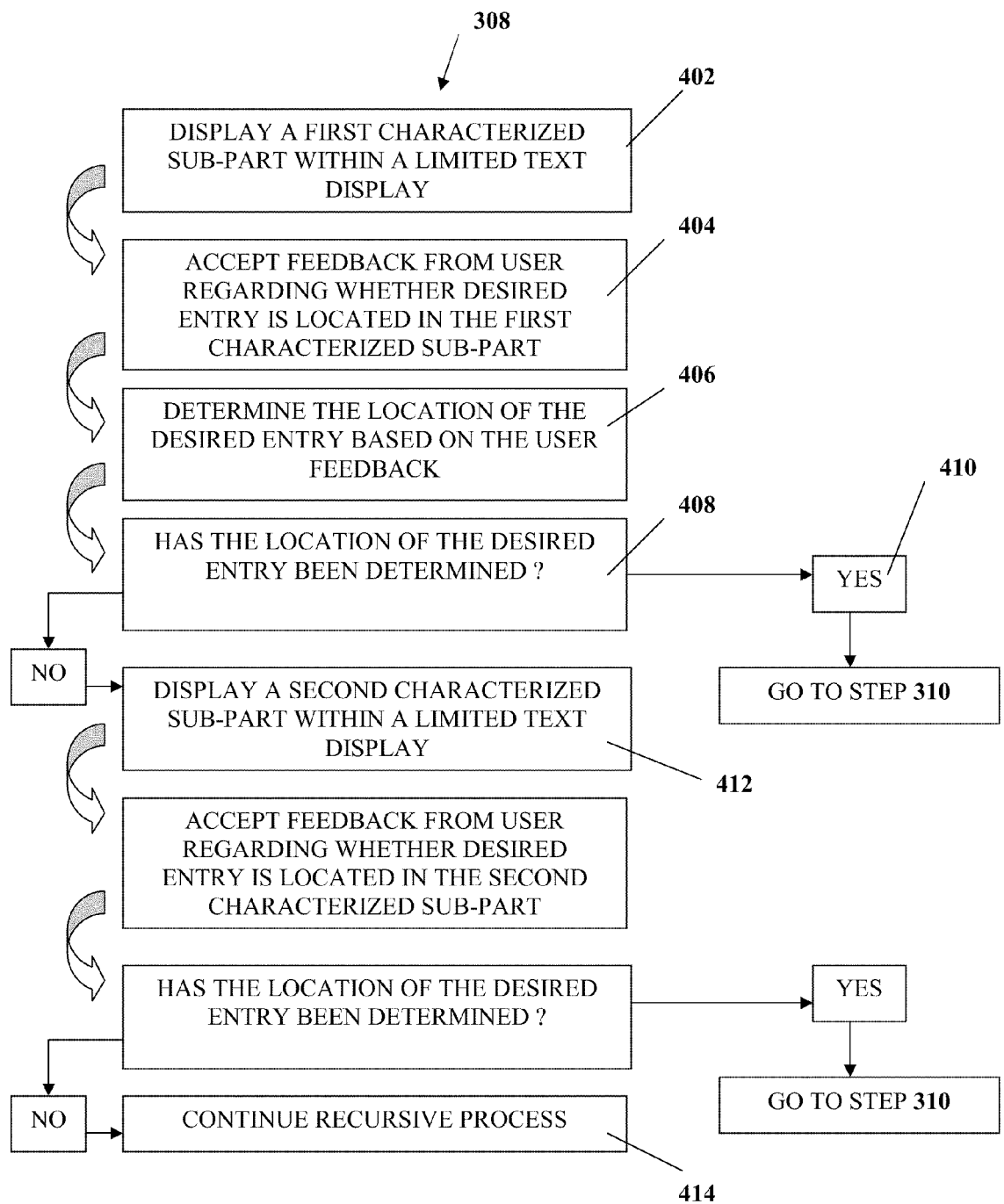
FIG. 4 shows a process for prompting the user about the location of a desired entry in a list sub-part in accordance with one embodiment of the present invention.

FIG. 4 shows the process 308 of prompting the user 106 about the location of a desired entry in more detail. The process 308 begins by displaying a first characterized sub-part 402. User feedback 108 regarding the location of the desired entry within the displayed sub-part is accepted 404. Next, based on the user's feedback 108, the location of the desired entry within the sub-parts is determined 406. Affirmative feedback 108 by the user 106 means that the desired entry is located in the first characterized sub-part. Accordingly, the location of the desired entry in a sub-part is determined 408 and the first sub-part is selected for further processing 310 (as shown in FIG. 3). Negative feedback 108 may also provide enough information to determine the location of the desired entry. For example, if there are only two sub-parts in-total or only two sub-parts remaining, negative feedback 108 by the user 106 for the first sub-part means that the desired entry is located in the second sub-part. In this manner, the location of the desired entry can be determined 408 and the second sub-part is selected for further processing 310 (as shown in FIG. 3). If the user 106 responds negatively and the sub-part in which the desired entry is located cannot be determined (e.g. there are more than two remaining sub-parts), then the next characterized sub-part is displayed 412. The recursive process continues until the desired entry is located or until all of the characterized sub-parts have been displayed 414.

With reference back to FIG. 3, once the sub-part containing the desired entry is selected 310, a determination is made whether the selected sub-part contains a limited number of entries 312. In some embodiments of the invention, the sub-part contains a limited number of entries when the desired entry is the only entry in the sub-part. In other embodiments, however, the limited number of entries can be a predetermined number of entries. In any event, if the sub-part does not contain a limited number of entries, the selected list is partitioned again into another set of sub-parts 314. The recursive step 314 continues until the sub-part contains a limited number of entries and/or less than a limited number of entries. In yet another embodiment, performance of the recursive step is not dependent upon the number of entries in the sub-part, but is dependent on the number of times the recursive step 314 is performed. In such an embodiment, the limited number of entries requirement is met when the recursive step 314 is run a predetermined number of times.

In illustrative embodiments of the invention, once the limited number of entries is obtained (e.g. there is a single entry remaining), the recursive process of step 314 discontinues and supplemental processing is initiated on the final sub-part of entries 316. If the entries in the final sub-part are media such as songs or movies, supplemental processing 316 may include playback of the songs or movies. If the entries in the final sub-part include names with associated phone numbers, supplemental processing 316 may include dialing the associated phone numbers. If the entries in the final sub-part include names of business and associated addresses, supplemental processing 316 may include selecting the address as a destination in a navigation device. In some embodiments, if the final sub-part includes multiple entries, supplemental processing 316 may include undergoing other entry selection strategies as described further herein, such as one-by-one presentation and/or using one-shot command words.

As discussed above, with reference to FIG. 3, step 304 partitions the list into (N) number of sub-parts. In the binary case, where N=2, only minimal feedback 108 from the user 106 is necessary. When N=2, if the user 106 responds affirmatively to the first sub-part, that sub-part is selected. If the user 106 responds negatively to the first sub-part, the second sub-part is selected because it can be assumed that the entry is located in the only other sub-part.

In the generic case, where N>2, the user feedback 108 is more complicated. For example, when N=3, if the user 106 responds negatively to the first sub-part, a determination of the location of the desired entry cannot be made until the user 106 responds to the second sub-part. Thus, when N=3, the user 106 may need to give feedback 108 for at least two sub-parts in order to properly locate the desired entry. A determination of the number of times to perform recursive step 314 can be based upon the efficiency of the search. The efficiency of using N>2 is in the order of $O(\log_N M)$, where M is the number of list entries. The impact of using an N>2 search strategy on the reduction of search complexity becomes more significant as the number of list entries (M) increases.

Figure 5:
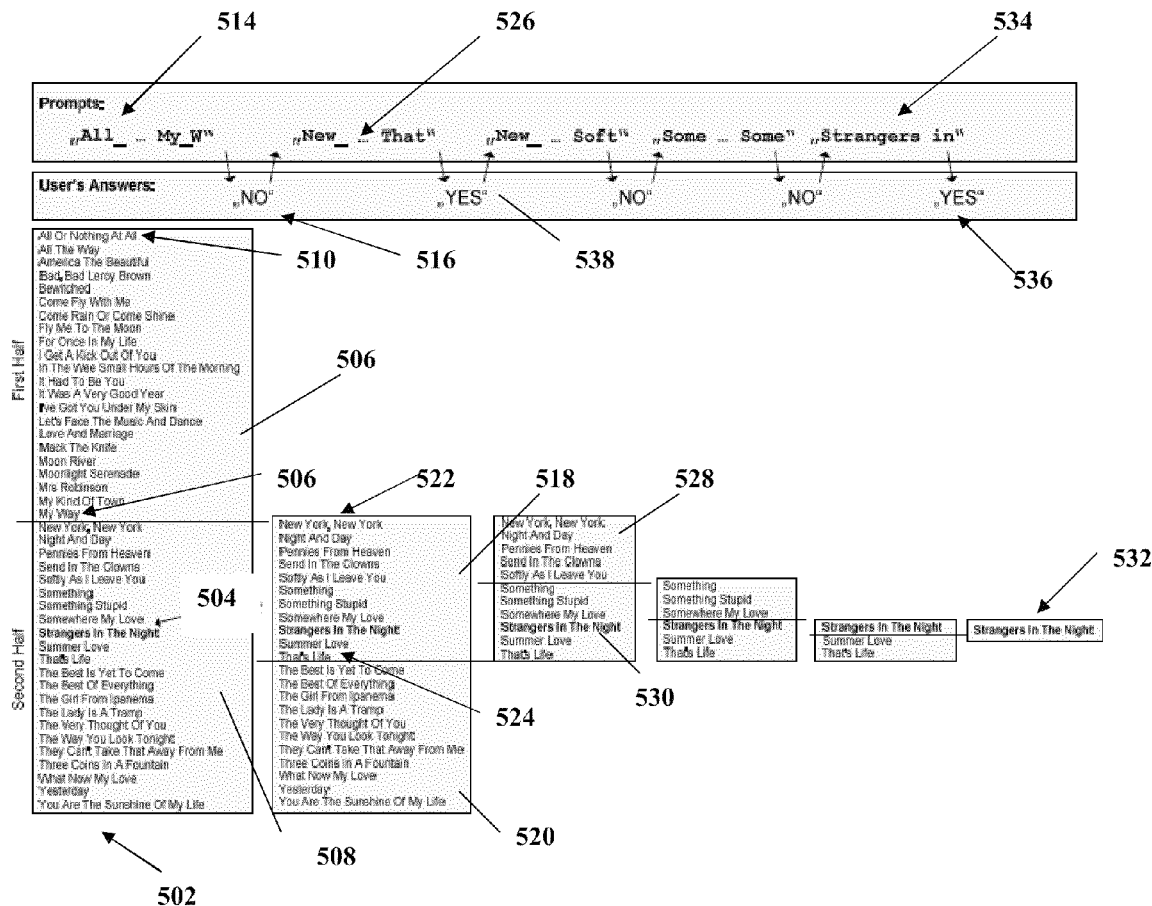
FIG. 5 shows a method for locating a desired song in a list of songs in accordance with one embodiment of the invention.

FIG. 5 shows the method 300 for locating a desired song in a list of songs in accordance with one embodiment of the invention. A sorted list of songs by Frank Sinatra 502 is provided. The list includes the song: "Strangers in the Night," which is the desired entry 504 that the user 106 would like to select and playback. FIG. 5 shoes a binary case, wherein N=2, and the list 502 is partitioned into a first sub-part 506 and a second sub-part 508. The method 300 next characterizes the first subpart so that the sub-part is displayed in the limited text display and so that the user 106 will be able to identify which songs are within that sub-part. The first song in the first sub-part, "All or Nothing at All" 510 and the last song in the first sub-part, "My Way" 512 are selected. The titles of the songs are abbreviated so that they fit on a 12-character text display. The user 106 is prompted by displaying the characterized song titles 514. FIG. 2 depicts the characterized titles displayed on a one-line 12-character text display 101. The list 502 is sorted alphabetically, so based on the starting letters of the first song 510 and the last song 512, the user 106 can determine whether the desired entry is within the first sub-part 506. Although in this exemplary embodiment, the list is alphabetical, in other embodiments, the entry lists can be sorted chronologically, numerically, by size of file, or by other entry characteristics. In this case, "Strangers in the Night" is not located between the letters "A" and "M," so the user 106 responds with a "No" 516. As explained above, the user's feedback 108 can be haptic or auditory.

Based on the user's feedback 108, a determination is made that the desired entry is located within the second sub-part. In another exemplary embodiment of the invention, if N=3, then the list 502 would be partitioned into three sub-parts. Furthermore, if the user's feedback 108 was a "No" after being prompted about the first sub-part, then the user 106 would need to be prompted about the second sub-part because the desired entry could be located in either the second or third sub-parts. In the embodiment shown in FIG. 5, however, prompting the user 106 about the second sub-part is unnecessary because, if not in the first sub-part, the desired entry can be assumed to be in the second sub-part.

Once the determination is made that the second sub-part contains the desired entry, the second sub-part is partitioned into a third sub-part 518 and fourth sub-part 520. Then, the third sub-part 518 is characterized by abbreviating the first song "New York, New York" 522 and last song "That's Life." The user 106 is prompted with the characterized sub-part 526 and the user 106 responds with a "Yes" 538 because "Strangers in the Night" is located within the third sub-part. Accordingly, the third sub-part is selected and further partitioned into a fifth 528 and sixth 530 sub-part. The method 300 continues until "Strangers in the Night" is the only remaining song 532. At that point, the song can be automatically played back, or the user 106 is prompted by displaying the title of the song 534. Affirmative feedback 108 from the user 106 will start playback of the song 536.

In illustrative embodiments of the invention, N may be modified as step 314 is recursively performed. In other words, the first time the list is partitioned, it is partitioned into three sub-parts, but when the sub-part with the desired entry is partitioned again, it may only be partitioned into two further sub-parts.

Figure 6:
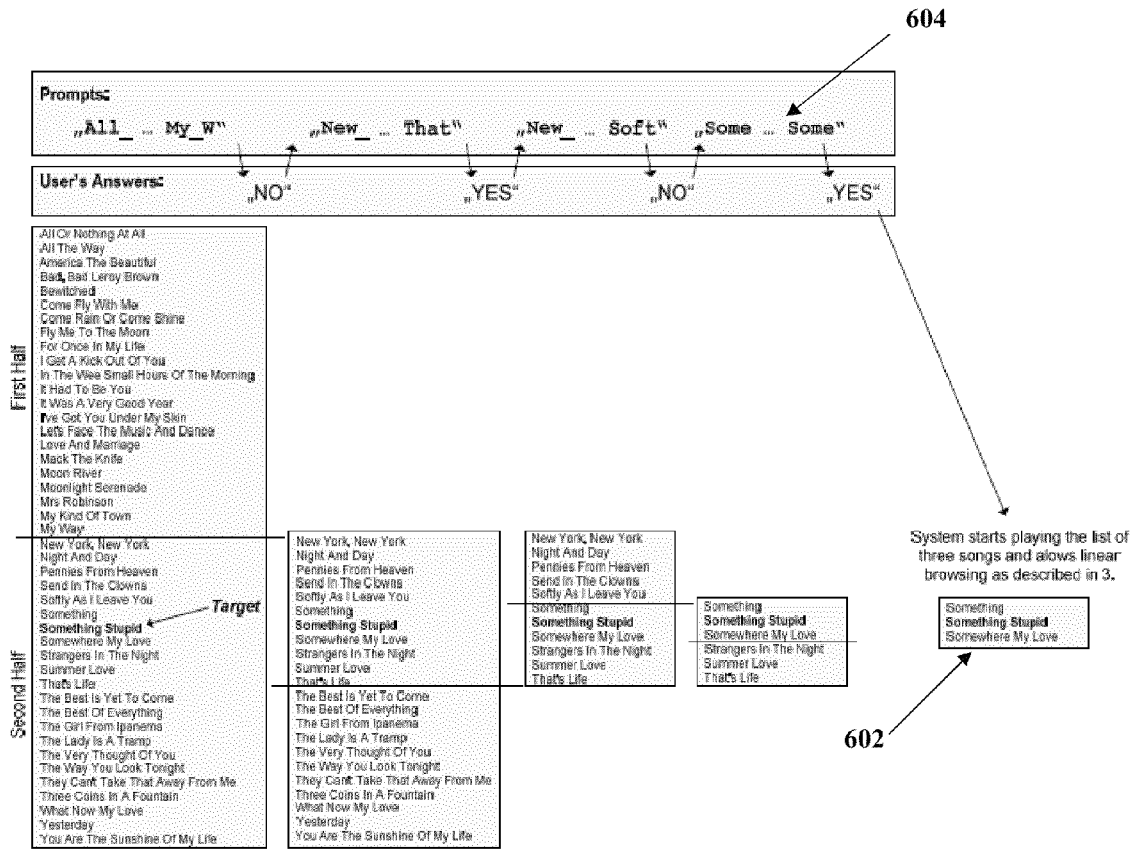
FIG. 6 shows an example wherein the remaining entries in a sub-part are ambiguous.

FIG. 6 shows an example wherein the remaining entries in a sub-part are ambiguous. Entries are ambiguous when the user 106 cannot identify a desired entry because other remaining entry titles start with the same letters. For example, in FIG. 5, the last three remaining songs 602 all start with the word "Some." The limitation of the 12-character text display 110 and the resulting prompt 604 does not allow the user 106 to determine whether the desired song is located in the sub-part. When the remaining entries in a sub-part become ambiguous, one solution is to present the remaining entries one-by-one in the limited text display 110 until the desired entry is displayed and selected by the user 106.

Figure 7:
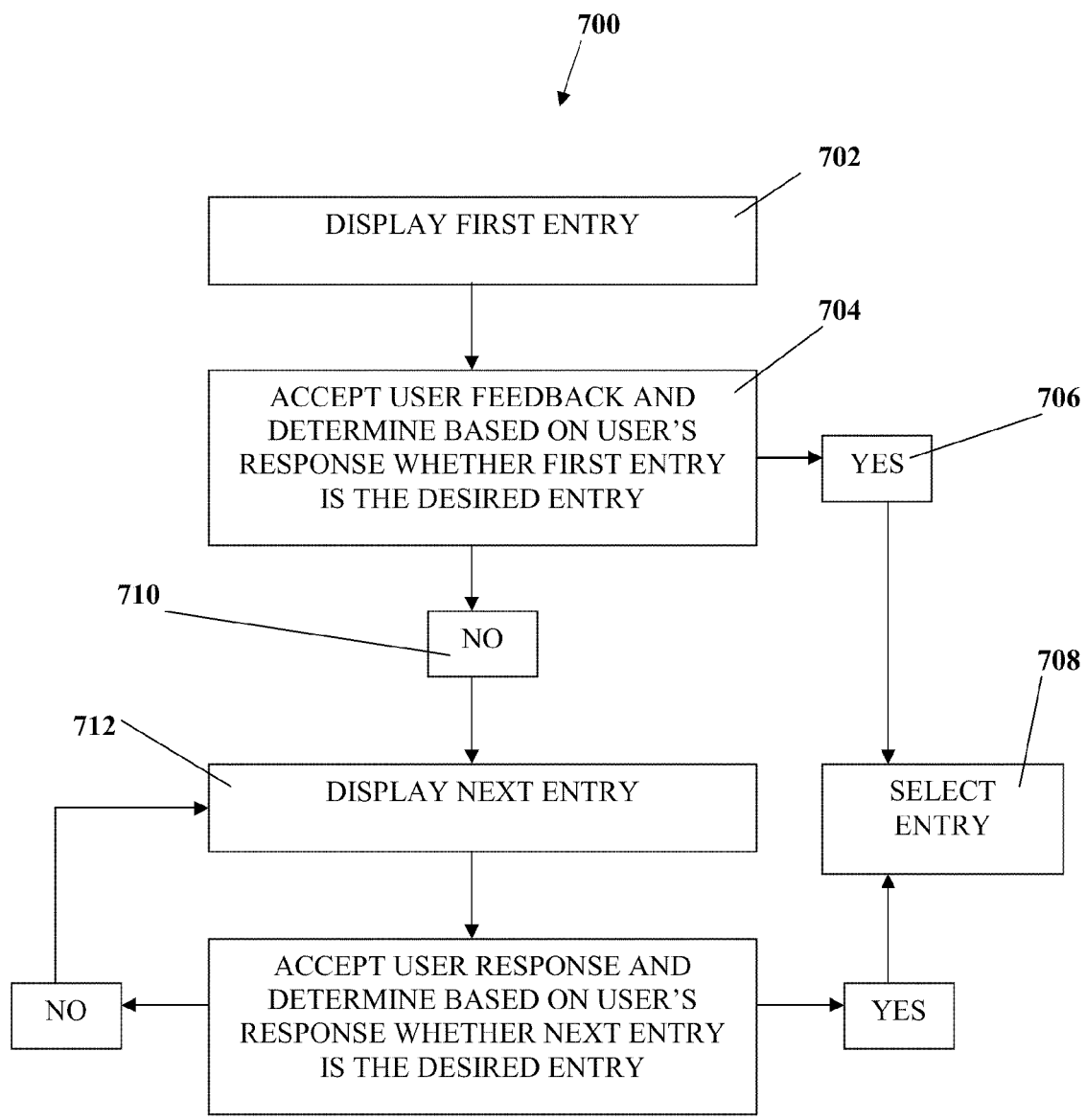
FIG. 7 shows a one-by-one presentation process in accordance with one embodiment of the present invention.
Figure 8:
FIG. 8 shows another example of a one-line 12-character limited text display.

FIG. 7 shows a one-by-one presentation process 700 in accordance with one embodiment of the present invention. The process 700 starts by displaying the first song in the sub-part within a limited text display 702. FIG. 8 depicts an example of the title "Strangers in the Night" displayed on a 12-character limited text display 110. As shown in FIG. 8, the entire title is not displayed, but identification of the entry is possible because, without characterization, more of the characters in the title are visible. With reference back to FIG. 7, once the song title is displayed, user feedback 108 is accepted, and based on that feedback 108 a determination is made whether the displayed entry is the desired entry 704. If the displayed entry is the desired entry, the user 106 responds affirmatively 706 and the displayed entry is selected as the desired entry 708. If the displayed entry is not the desired entry, then the user 106 can answer negatively 710 and another entry in the sub-part will be displayed 712. Additionally or alternatively, the user 106 may not need to respond with a negative command. Instead, after a predetermined time the program automatically displays the next entry. In such an embodiment, the user 106 may have the capability to control the rate and order in which the entries are displayed. The one-by-one presentation of the entries may continue until the user 106 selects an entry or until all of the entries in the list have been browsed.

Figure 9:
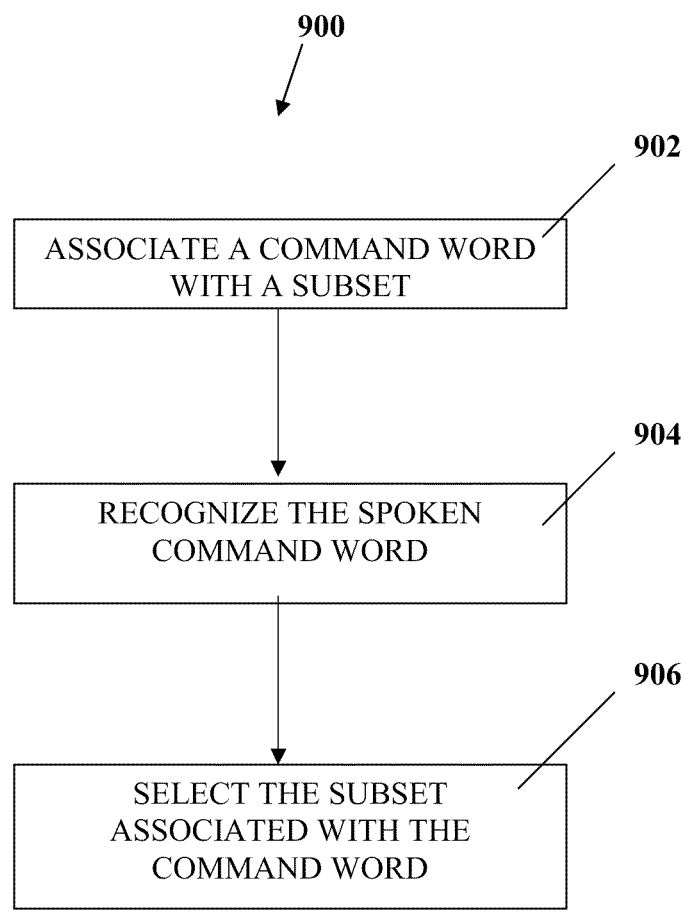
FIG. 9 shows a process of selecting predefined subsets using one-shot command words in accordance with one embodiment of the present invention.

FIG. 9 shows a process 900 for selecting predefined subsets using one-shot command words in accordance with one embodiment of the present invention. A subset is a list of entries in which the entries belong to a certain category or have a certain common characteristic. In the embodiment shown in FIG. 9, the subset is associated with a command word 902. When the user 106 speaks the command word, the command word is recognized 904 (by, for example, a speech recognition engine) and the associated subset is selected for play back or other processing 906. For example, when the user 106 speaks the command word "Play_Rock," all of the entries belonging to a Rock genre are played back. Although the process uses a more sophisticated speech recognition engine, visual feedback 108 is not required. Also, selected subsets can be played back without any further browsing or searching.

The one-shot command word process 900 can be combined with other search strategies disclosed herein, such as the one-by-one presentation process 700 or the method for locating a desired entry 300. For example, the user 106 can display the different subsets of artists by speaking the command word "select_artist" and a one-by-one "scrolling" presentation of the available artists begins. As soon as the name "The Beatles" appears on the display 110, the user 106 speaks "play_this_one" and play back of all the Beatles songs begins. In another embodiment, the user 106 can speak "select_song" and all of the Beatles songs are presented one-by-one on the limited text display 110. As soon as the song "Yellow Submarine" appears on the display 110, the user 106 speaks "play_this_one" and play back of only that song begins. In yet another embodiment, where the list of songs is long and the user 106 has a desired song in mind, instead of scrolling through the songs, the method for locating a desired entry 300 can be used to find and play back the desired song.

Embodiments of the present invention may be implemented in any conventional computer programming language. For example, embodiments may be implemented in a procedural programming language (e.g. "C") or an object oriented programming language (e.g. "C++", Python). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the disclosed device and method. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention. All such variations and modifications are intended to be within the scope of the present invention as defined in any appended claims.

What is claimed is:

1. A method of locating a desired entry in an ordered list having a plurality of sequential list entries on a limited text display having only a single line of text, the method comprising:

in a processor, partitioning a current part of the ordered list into two equal list sub-parts each containing a plurality of sequential list entries such that the desired entry is contained in one of the list sub-parts;

characterizing at least one of the list sub-parts within the single line of the limited text display to prompt a user for feedback regarding the location of the desired entry in the list sub-parts;

receiving user feedback from a view input element;

in response to the user feedback, in the processor, selecting one or more of the list sub-parts including the list sub-part containing the desired entry; and re-performing the partitioning, characterizing, receiving, and selecting one or more times to generate a final list sub-part of the list with a limited number of entries including the desired entry.

2. A method according to claim 1, wherein the partitioning, characterizing, receiving, and selecting are re-performed a predetermined number of times.

3. A method according to claim 1, wherein the ordered list of sequential entries is in alphabetical order.

4. A method according to claim 1, wherein the ordered list of sequential entries is initially selected by using a command word associated with the list.

5. A method according to claim 1, further comprising:
displaying entries in the final list sub-part within the limited single line text display.

6. A method according to claim 5, further comprising:
accepting a user selection in response to the display of the final list sub-part; and
selecting the desired entry in response to the user selection.

7. A method according to claim 1, wherein the method is performed on any one of a cellular phone, a smart phone, a personal assistant, a navigation device, or a media player.

8. A device for locating a desired entry in an ordered list having a plurality of sequential list entries, the device comprising:
a digital memory for storing the plurality of sequential list entries;
a processor for partitioning a current part of the ordered list into two equal list sub-parts each containing a plurality of sequential list entries such that the desired entry is contained in one of the list sub-parts;
a limited text display having only a single line of text for characterizing at least one of the list sub-parts to prompt a user for feedback regarding the location of the desired entry in the list sub-parts; and
a view input element for receiving user feedback regarding the location of the desired entry in the list sub-parts,
wherein the processor, in response to the user feedback, selects one or more of the list sub-parts including the list sub-part containing the desired entry and re-performs the partitioning, characterizing, receiving, and selecting one or more times to generate a final list sub-part of the list with a limited number of entries including the desired entry.

9. A device according to claim 8, wherein the processor re-performs the partitioning, characterizing, receiving, and selecting a predetermined number of times.

10. A device according to claim 8, wherein the ordered list of sequential entries is in alphabetical order.

11. A device according to claim 8, wherein the ordered list is initially selected by using a command word associated with the list.

12. A device according to claim 8, wherein the limited single line text display displays entries in the final list sub-part.

13. A device according to claim 12, wherein the view input element accepts a user selection in response to the display of the final list sub-part and the processor selects the desired entry in response to the user selection.

14. A device according to claim 8, wherein the device is incorporated into any one of a cellular phone, a smart phone, a personal assistant, a navigation device, or a media player.

15. A computer program product for use on a computer system for locating a desired entry in an ordered list having a plurality of sequential list entries using a limited text display having only a single line of text, the computer program product comprising a computer readable storage medium having computer readable code thereon, the computer readable program code comprising:
computer code for partitioning a current part of the ordered list into two equal list sub-parts each containing a plurality of sequential list entries such that the desired entry is contained in one of the list sub-parts;
computer code for characterizing at least one of the list sub-parts within the limited text display having only a single line of text to prompt a user for feedback regarding the location of the desired entry in the list sub-parts;
computer code for receiving user feedback from a view input element;
computer code for, in response to the user feedback, selecting one or more of the list sub-parts including the list sub-part containing the desired entry; and
computer code for re-performing the partitioning, characterizing, receiving, and selecting one or more times to generate a final list sub-part of the list with a limited number of entries including the desired entry.

16. A computer program product according to claim 15, wherein the partitioning, characterizing, receiving, and selecting are re-performed a predetermined number of times.

17. A computer program product according to claim 15, wherein the ordered list of sequential entries is in alphabetical order.

18. A computer program product according to claim 15, wherein the ordered list of sequential entries is initially selected by using a command word associated with the list.

19. A computer program product according to claim 15, further comprising:
computer code for displaying entries in the final list sub-part within the limited text display.

20. A computer program according to claim 19, further comprising:
computer code for accepting a user selection in response to the display of the final list sub-part; and
computer code for selecting the desired entry in response to the user selection.

21. A computer program product according to claim 15, wherein the computer program product is configured for use on any one of a cellular phone, a smart phone, a personal assistant, a navigation device, or a media player.

* * * * *